United States Patent [19]

Fischer

[11] 3,773,492
[45] Nov. 20, 1973

[54] HERBICIDE

[75] Inventor: Adolf Fischer, Mutterstadt, Germany

[73] Assignee: Badische Anilin- & Soda-Fabrik Aktiengesellschaft, Ludwigshafen/Rhineland Rhineland-Pfalz, Germany

[22] Filed: Apr. 22, 1970

[21] Appl. No.: 30,936

[30] Foreign Application Priority Data
Apr. 26, 1969 Germany.................. P 19 21 464.3

[52] U.S. Cl.......................... 71/92, 71/104, 71/105, 71/118
[51] Int. Cl................................................ A01n 9/22
[58] Field of Search................................ 71/92, 118

[56] References Cited
UNITED STATES PATENTS
3,535,377 10/1970 Steinbrunn et al. ................... 71/118
3,437,664 4/1969 Krenzer ................................... 71/92

Primary Examiner—Lewis Gotts
Assistant Examiner—Catherine L. Mills
Attorney—Johnston, Root, O'Keeffe, Keil, Thompson & Shurtleff

[57] ABSTRACT

Herbicidal mixtures containing an acid anilide in admixture with a pyridazone derivative or a substituted oxazolidine-3,5-dione derivative and a process for controlling the growth of unwanted plants with these mixtures.

3 Claims, No Drawings

HERBICIDE

The present invention relates to herbicides comprising mixtures of active ingredients. It relates in particular to herbicides containing mixtures of active ingredients including acid anilides.

It is known to use acid anilides, especially chloroacetic acid-N-butyn-(1)-yl-(3)-anilide, as herbicidal active ingredients.

It is also known to use pyridazone derivatives, especially 1-phenyl-4-amino-5-chloropyridazone-(6), or substituted 1,2,4-oxadiazolidine-3,5-dione derivatives for controlling unwanted plants; however, the herbicidal action of these known active ingredients is not satisfactory.

We have now found that a herbicide containing a mixture of a. an acid anilide having the formula

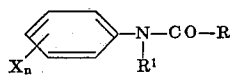

where X denotes thiocyano, halogen (Cl, Br, I), a nitro group, a trifluoromethyl or alkyl radical having one to three carbon atoms, or an alkoxy radical, R denotes an aliphatic radical having one to three carbon atoms which may be substituted by chlorine, bromine, cyano or thiocyano, $R^1$ denotes an alkyl radical having one to three carbon atoms which may be substituted by halogen or $R^1$ denotes an alkynyl radical having three to five carbon atoms, and n denotes one of the integers 0, 1, 2 and 3, and b. a pyridazone derivative having the formula

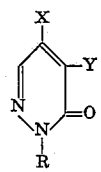

where R denotes a phenyl radical which may be substituted by methyl or trifluoromethyl, R denotes a cyclohexyl radical, X denotes an amino, acetylamino or methoxy radical, a NH-CO-COOR$^1$ group, $R^1$ denoting hydrogen or a methyl, ethyl or phenyl radical, and Y denotes chlorine, bromine, iodine, methyl or methoxy, or an alkali metal (sodium, potassium) or amine (dimethylethanolamine, diethylenetriamine, ethanolethylenediamine, (trimethanol)-methylamine, diethylethanolamine) salt thereof, or c. an oxadiazolidinedione derivative having the formula

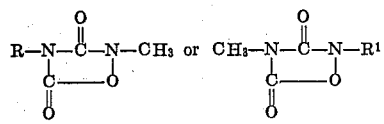

where R denotes a M-chlorophenyl, m-trifluoromethylphenyl, 3,4-dichlorophenyl, 3-chloro-4-bromophenyl or methylphenyl radical and $R^1$ denotes a 3,4-dichlorophenyl, 4-chlorophenyl, phenyl, 3-trifluoromethylphenyl, 3-isopropylcarbamoyloxyphenyl, 3-butyl- carbamoyloxyphenyl, cyclohexyl, m-ethylcarbamoyloxyphenyl, m-carboxyisoproplphenyl, or m-tert-butylcarbamoyloxyphenyl radical, has a good herbicidal action.

The particular advantage of the herbicides according to the invention is that they are extremely effective especially in dry weather when used preemergence against most mono- and dicotyledonous weeds. The individual active ingredients may be mixed with each other in any ratio; it is, however, preferred to use a ratio (by weight) of a to b or c of 5 : 1 to 1 : 3.

The herbicides according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, the solution in water is suitable. However, hydrocarbons having boiling points higher than 150° C, e. g. tetrahydronaphthalene or alkylated naphthalenes, or organic liquids having boiling points higher than 150° C and having one or more than one functional group, e. g. the keto group, the ether group, the ester group or the amido group, this group or these groups being attached as substituent(s) to a hydrocarbon chain or being a component of a heterocyclic ring, may also be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agent, e. g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e. g. kieselguhr, talc, clay or fertilizers.

The mixtures may be applied per se or in admixture with insecticides, fungicides and fertilizers.

The following comparative experiments illustrate the application of the herbicides according to the invention.

EXAMPLE 1

In a greenhouse, sandy soil is filled into pots and sown with the seeds of Indian corn (Zea mays), cotton (Gossypium herbaceum), soya bean (Glycine hispida), yellow foxtail (Setaria glauca), barnyard grass (Echinochloa crusgalli), annual bluegrass (Poa annua), perennial ryegrass (Lolium perenne), wild mustard (Sinapis arvensis), redroot pigweed (Amaranthus retroflexus) and dallisgrass (Paspalum dilatatum). The soil prepared in this manner is then immediately treated with the stated amounts of the following active ingredients and mixtures of them, each active ingredient and each mixture being dispersed in 500 liters of water per hectare:

I chloroacetic acid-N-butyn-(1)-yl-(3)-anilide, 3 and 4 kg per hectare;

II 1-cyclohexyl-4-methoxy-5-bromopyridazone-(6), 1 and 4 kg per hectare;

III 1-phenyl-4-methoxy-5-bromopyridazone-(6), 1 and 4 kg per hectare;

I + II: 3 + 1 kg per hectare;

I + III: 3 + 1 kg per hectare.

The results of the experiment after 4 weeks are given in the following table.

|  | Active ingredient | | | | | | | |
|---|---|---|---|---|---|---|---|---|
|  | I | | II | | III | | I+II | I+III |
| Application rate in kg./ha. | 3 | 4 | 1 | 4 | 1 | 4 | 3+1 | 3+1 |
| Zea mays | 0 | 0 | 0 | 30 | 0 | 20 | 0 | 0 |
| Gossypium herbaceum | 0 | 0 | 0 | 40 | 0 | 20 | 0 | 0 |
| Glycine hispida | 0 | 0 | 0 | 40 | 0 | 20 | 0 | 0 |
| Setaria glauca | 90 | 100 | 0 | 50 | 20 | 60 | 90 | 100 |
| Echinochloa crus-galli | 90 | 100 | 50 | 70 | 70 | 100 | 100 | 100 |
| Paspalum dilatatum | 100 | 100 | 35 | 60 | 20 | 50 | 100 | 100 |
| Poa annua | 95 | 100 | 95 | 100 | 50 | 90 | 100 | 100 |
| Lolium perenne | 90–100 | 100 | 90 | 100 | 40 | 80 | 100 | 100 |
| Sinapis arvensis | 10 | 15 | 90 | 100 | 80 | 100 | 100 | 90 |
| Amaranthus retroflexus | 0–10 | 20 | 80 | 100 | 70 | 100 | 80–90 | 80 |

0 = no damage; 100 = complete destruction.

NOTE.—These results show that the herbicides according to the invention have not only a surprising action on weeds but also in particular a selective action which could not be expected from a knowledge of the components of the mixture.

EXAMPLE 2

An agricultural site is sown with Indian coren (*Zea mays*), yellow foxtail (*Setaria glauca*), barnyard grass (*Echinochloa crus-galli*), witchgrass (*Panicum capillare*), large crabgrass (*Digitaria sanguinalis*), annual bluegrass (*Poa annua*), perennial rygrass (*Lolium perenne*), wild mustard (*Sinapis arvensis*) and redroot pigweed (*Amaranthus retroflexus*).

The soil prepared in this manner is then immediately treated with the stated amounts of the following active ingredients and mixtures of them, each active ingredient and each mixture being dispersed in 500 liters of water per hectare:

I  chloroacetic acid-N-butyn-(1)-yl-(3)-amilide, 3 and 4 kg per hectare;

IV  1-phenyl-4-amino-5-chloropyridazone-(6), 1 and 4 kg per hectare;

V  1-phenyl-4-amino-5-bromopyridazone-(6), 1 and 4 kg per hectare;

VI  the N,N-dimethylethanolamine salt of N-[1-phenyl-5-bromopyridazon-(6)-yl-(4)]-oxamic acid, 1 and 4 kg per hectare;

VII  the sodium salt of N-[1-phenyl-5-bromopyridazon 6)-yl-(4)]-oxamic acid, 1 and 4 kg per hectare;

VIII  1-cyclohexl-4-amino-5-bromopyridazone-(6), 1 and 4 kg per hectare;

IX  1-cyclohexyl-4,5-dimethylpyridazone-(6), 1 and 4 kg per hectare;

I + IV: 3 + 1 kg per hectare;
I + V: 3 + 1 kg per hectare;
I + VI: 3 + 1 kg per hectare;
I + VII: 3 + 1 kg per hectare;
I + VIII: 3 + 1 kg per hectare;
I + IX: 3 + 1 kg per hectare.

The results of the experiment after 4 weeks are given in the following table.

|  | Active ingredient | | | | | | | | | |
|---|---|---|---|---|---|---|---|---|---|---|
|  | I | | IV | | V | | VI | | VII | |
| Application rate in kg./ha. | 3 | 4 | 1 | 4 | 1 | 4 | 1 | 4 | 1 | 4 |
| Zea mays | 0 | 0 | 0 | 20 | 0 | 30 | 0 | 20 | 0 | 30 |
| Setaria glauca | 90 | 100 | 0 | 50 | 10 | 50 | 5–10 | 40 | 40 | 80 |
| Echinochloa crus-galli | 90 | 100 | 20 | 80 | 30–40 | 70 | 50–60 | 90 | 60 | 100 |
| Panicum capillare | 90 | 90 | 50 | 90 | 60 | 90 | 50–60 | 90 | 60 | 90 |
| Digitaria sanguinalis | 100 | 100 | 10 | 80 | 30 | 70 | 20 | 50 | 40 | 80 |
| Poa annua | 95 | 100 | 80 | 100 | 50–60 | 90 | 65 | 100 | 70 | 100 |
| Lolium perenne | 90–100 | 100 | 70 | 90 | 50 | 90 | 60 | 100 | 70 | 100 |
| Sinapis arvensis | 10 | 15 | 80 | 100 | 90 | 100 | 90 | 100 | 100 | 100 |
| Amaranthus retroflexus | 0–10 | 20 | 80 | 100 | 90 | 100 | 70 | 90 | 90 | 100 |

|  | VII | | IX | | I+IV | I+V | I+VI | I+VII | I+VIII | I+IX |
|---|---|---|---|---|---|---|---|---|---|---|
| Application rate in Kg./ha. | 1 | 4 | 1 | 4 | 3+1 | 3+1 | 3+1 | 3+1 | 3+1 | 3+1 |
| Zea mays | 0 | 20 | 0 | 20 | 0 | 0 | 0 | 0 | 0 | 0 |
| Setaria glauca | 10 | 40 | 50 | 70 | 09 | 100 | 90–100 | 100 | 100 | 100 |
| Echinochloa crus-galli | 10 | 40 | 50 | 70 | 100 | 100 | 100 | 100 | 100 | 100 |
| Panicum capillare | 20 | 60 | 30 | 50 | 100 | 100 | 100 | 100 | 100 | 100 |
| Digitaria sanguinalis | 10 | 50 | 20 | 40 | 100 | 100 | 100 | 100 | 100 | 100 |
| Poa annua | 70 | 90 | 70 | 90 | 100 | 100 | 100 | 100 | 100 | 100 |
| Lolium perenne | 70 | 90 | 70 | 90 | 100 | 100 | 100 | 100 | 100 | 100 |
| Sinapis arvensis | 80 | 100 | 90 | 100 | 90 | 100 | 100 | 100 | 90 | 100 |
| Amaranthus retroflexus | 70 | 90 | 80 | 100 | 90 | 90–100 | 70–80 | 90–100 | 70–80 | 80–90 |

0 = no action; 100 = complete destruction.

NOTE.—These results show that the herbicides according to the invention have not only a surprising action on weeds but also in particular a selective action which could not be expected from a knowledge of the components of the mixture.

EXAMPLE 3

An agricultural site is sown with soya bean (*Glycine hispida*), yellow foxtail (*Setaria glauca*), barnyard grass (*Echinochloa crus-galli*), large crab-grass (*Digitaria sanguinalis*), perennial ryegrass (*Lolium perenne*), wild mustard (*Sinapis arvensis*) and redroot pigweed (*Amaranthus retroflexus*). The soil prepared in this manner is then immediately treated with the stated amounts of the actve ingredients and mixture of them, each active ingredient and the mixture being dispersed in 500 liters of water per hectare:

I chloroacetic acid-N-butyn-(1)yl-(3)-anilide, 3 and 4 kg per hectare;
X 1-phenyl-4,5-dimethoxypyridazone-(6), 1 and 4 kg per hectare;
I + X: 3 + 1 kg per hectare.

The results of the experiment after 4 weeks are given in the following table:

| Active ingredient | I | | X | | I + X |
|---|---|---|---|---|---|
| Application rate in kg/ha | 3 | 4 | 1 | 4 | 3 + 1 |
| Glycine hispida | 0 | 0 | 0 | 20 | 0 |
| Setaria glauca | 90 | 100 | 10 | 40 | 100 |
| Echinochloa crus-galli | 90 | 100 | 40–50 | 80 | 100 |
| Digitaria sanguinalis | 100 | 100 | 50 | 80 | 100 |
| Lolium perenne | 90–100 | 100 | 70 | 100 | 100 |
| Sinapis arvensis | 10 | 15 | 100 | 100 | 100 |
| Amaranthus retroflexus | 0–10 | 20 | 80 | 100 | 90 |

0 = no damage
100 = complete destruction

The results show that the herbicides according to the invention have not only a surprising action on weeds but also in particular a selective action which could not be expected froma knowledge of the components of the mixture.

EXAMPLE 4

An agricultural site is sown with cotton (*Gossypium herbaceum*), barnyard grass (*Echinochloa crus-galli*), large crabgrass (*Digitaria sanguinalis*), annual bluegrass (*Poa annua*), perennial ryegrass (*Lolium perenne*), redroot pigweed (*Amaranthus retroflexus*) and wild radish (*Raphanus raphanistrum*). The soil prepared in this manner is then immediately treated with the stated amounts of the following active ingredients and mixture of them, each active ingredient and the mixture being disposed in 500 liters of water per hectare:

I chloroacetic acid-N-butyn-(1)-yl-(3)-anilide, 3 and 4 kg per hectare;
XI 1-m-trifluoromethylphenyl-4-methoxy-5-chloropyridazone-(6), 1 and 4 kg per hectare;
I + XI: 3 + 1 kg per hectare.

The results of the experiment after 4 weeks are given in the following table:

| Active ingredient | I | | XI | | I + XI |
|---|---|---|---|---|---|
| Application rate in kg/ha | 3 | 4 | 1 | 4 | 3 + 1 |
| Gossypium herbaceum | 0 | 0 | 0 | 10 | 0 |
| Echinochloa crus-galli | 90 | 100 | 40 | 90 | 100 |
| Digitaria sanguinalis | 100 | 100 | 50 | 90 | 100 |
| Poa annua | 95 | 100 | 70 | 100 | 100 |
| Lolium perenne | 90–100 | 100 | 60 | 90 | 100 |
| Amaranthus retroflexus | 0–10 | 20 | 80 | 90–100 | 100 |
| Raphanus raphanistrum | 20 | 40 | 80 | 100 | 100 |

0 = no damage
100 = complete destruction

These results show that the herbicides according to the invention have not only a surprising action on weeds but also in particular a selective action which could not be expected from a knowledge of the components of the mixture.

EXAMPLE 5

In a greenhouse, sandy soil is filled into pots and sown with the seeds of Indian corn (*Zea mays*), cotton (*Gossypium herbaceum*), yellow foxtail (*Setaria glauca*), large crabgrass (*Digitaria snaguinalis*), barnyard grass (*Echinochloa crus-galli*), annual bluegrass (*Poa annua*), redroot pigweed (*Amaranthus retroflexus*) and wild mustard (*Sinapis arvensis*). The soil prepared in this manner is then immediately treated with the stated amounts of the following active ingredients and mixture of them, each active ingredient and the mixture being dispersed in 500 liters of water per hectare:

I chloroacetic acid-N-butyn-(1)-yl-(3)-anilide; 3 and 4 kg per hectare;
XII N-[1-phenyl-5-bromopyridazon-(6)-yl-(4)]-oxamic acid phenyl ester, 1 and 4 kg per hectare;
I + XII: 3 + 1 kg per hectare.

The results of the experiment after 4 weeks are given in the following table:

| Active ingredient | I | | XII | | I + XII |
|---|---|---|---|---|---|
| Application rate in kg/ha | 3 | 4 | 1 | 4 | 3 + 1 |
| Zea mays | 0 | 0 | 0 | 20 | 0 |
| Gossypium herbaceum | 0 | 0 | 0 | 20 | 0 |
| Setaria glauca | 90 | 100 | 30 | 80 | 100 |
| Digitaria sanguinalis | 100 | 100 | 40 | 70 | 100 |
| Echinochloa crus-galli | 90 | 100 | 30 | 60 | 100 |
| Poa annua | 95 | 100 | 70 | 100 | 100 |
| Amaranthus retroflexus | 0–10 | 20 | 80 | 100 | 80–90 |
| Sinapis arvensis | 10 | 15 | 80–90 | 100 | 90–100 |

0 = no damage
100 = complete destruction.

These results show that the herbicides according to the invention have not only a surprising action on weeds but also in particular a selective action which could not be expected from a knowledge of the components of the mixture.

EXAMPLE 6

An agricultural site is sown with cotton (*Gossypium herbaceum*), Indian corn (*Zea mays*), yellow foxtail (*Setaria glauca*), large crabgrass (*Digitaria sanguinalis*), barnyard grass (*Echinochloa crus-galli*), slender foxtail (*Alopecurus myosuroides*), annual bluegrass (*Poa annua*), perennial ryegrass (*Lolium perenne*), field pennycress (*Thlaspi arvense*), redroot pigweed (*Amaranthus retroflexus*), wild mustard (*Sinapis arvensis*) and wild radish (*Raphanus raphanistrum*). The soil prepared in this manner is then immediately treated with the stated amounts of the following active ingredients and mixture of them, each active ingredient and the mixture being dispersed in 500 liters of water per hectare:

I chloroacetic acid-N-butyn-(1)-yl-(3)-anilide, 3 and 4 kg per hectare;
XIII 4-(3,4-dichlorophenyl)-2-methyl-1,2,4-oxadiazolidine-3,5-dione, 1 and 4 kg per hectare;
I + XIII: 3 + 1 kg per hectare.

The results of the experiment after 4 weeks are given in the following table:

| Active ingredient | I | | XIII | | I + XIII |
|---|---|---|---|---|---|
| Application rate 176 kg/ha | 3 | 4 | 1 | 4 | 3 + 1 |
| Gossypium herbaceum | 0 | 0 | 0 | 10–20 | 0 |
| Zea mays | 0 | 0 | 0 | 10–20 | 0 |
| Setaria glauca | 90 | 100 | 20–30 | 70 | 100 |

| | | | | | |
|---|---|---|---|---|---|
| Digitaria sanguinalis | 100 | 100 | 60 | 90 | 100 |
| Echinochloa crus-galli | 90 | 100 | 40 | 70 | 100 |
| Alopecurus myosuroides | 70 | 80 | 70 | 90–100 | 100 |
| Poa annua | 95 | 100 | 20–30 | 90 | 100 |
| Lolium perenne | 90–100 | 100 | 20 | 80 | 100 |
| Thlaspi arvense | 50 | 70 | 80 | 100 | 100 |
| Amaranthus retroflexus | 0–10 | 20 | 100 | 100 | 100 |
| Sinapis arvensis | 10 | 15 | 70 | 100 | 80 |
| Raphanus raphanistrum | 20 | 40 | 70 | 100 | 90 |

0 = no damage
100 = complete destruction

These results show that the herbicides according to the invention have not only a surprising action on weeds but also in particular a selective action which could not be expected from a knowledge of the components of the mixture.

EXAMPLE 7

An agricultural site is sown with soya bean (*Glycine hispida*), Indian corn (*Zea mays*), green foxtail (*Setaria viridis*), large crabgrass (*Digitaria sanguinalis*), barnyard grass (*Echinochloa crus-galli*), slender foxtail (*Alopercurus myosuroides*), annual bluegrass (*Poa annua*), perennial ryegrass (*Lolium perenne*), field pennycress (*Thlaspi arvense*), redroot pigweed (*Amaranthus retroflexus*), wild mustard (*Sinapis arvensis*) and wild radish (*Raphanus raphanistrum*). The soil prepared in this manner is then immediately treated with the stated amounts of the following active ingredients and mixtures of them, each active ingredient and each mixture being dispersed in 500 liters of water per hectare:

I chloroacetic acid-N-butyn-(1)-yl-(3)-anilide, 3 and 4 kg per hectare;

XIV  2-(m-butylcarbamoylphenyl)-4-methyl-1,2,4-oxadiazolidine-3,5-dione, 1 and 4 kg per hectare;

XV  2-(m-isopropylcarbamoylphenyl)-4-methyl-1,2,4-oxadiazolidine13,5-dione, 1 and 4 kg per hectare;

I + XIV: 3 + 1 ke per hectare;
I + XV: 3 + 1 kg per hectare.

The results of the experiment are given in the following table:

(*Setaria glauca*), large crabgrass (*Digitaria sanguinalis*), barnyard grass (*Echinochloa crus-galli*), slender foxtail (*alopecurus myosuroides*), annual bluegrass (*Poa annua*), perennial ryegrass (*Lolium perenne*), wild oat (*Avena fatua*), field pennycress (*Thlaspi arvense*), redroot pigweed (*Amaranthus retroflexus*), wild mustard (*Sinapis arvensis*) and wild radish (*Raphanus raphanistrum*). The soil prepared in this manner is then immediately treated with the stated amounts of the following active ingredients and mixtures of them, each active ingredient and each mixture being dispersed in 500 liters of water per hectare:

I chloroacetic acid-N-butyn-(1)-yl-(3)-anilide, 3 and 4 kg per hectare;

XVI  2-(3-chloro-4-bromophenyl)-4-methyl-1,2,4-oxadiazolidine-3,5-dione, 1 and 4 kg per hectare;

XVII  2-(3,4-dichlorophenyl)-4-methyl-1,2,4-oxadiazolidine-3,5-dione, 1 and 4 kg per hectare;

XVIII  2-(4-chlorophenyl)-4-methyl-1,2,4-oxadiazolidine-3,5-dione, 1 and 4 kg per hectare;

I + XVI: 3 + 1 kg per hectare;
I + XVII: 3 + 1 kg per hectare;
I + XVIII: 3 + 1 kg per hectare.

The results of the experiment are given in the following table:

| | Active ingredient | | | | | |
|---|---|---|---|---|---|---|
| | I | | XVI | | XVII | |
| Application rate in kg./ha | 3 | 4 | 1 | 4 | 1 | 4 |
| Gossypium herbaceum | 0 | 0 | 0 | 10 | 0 | 10 |
| Zea mays | 0 | 0 | 0 | 20 | 0 | 20 |
| Setaria glauca | 90 | 100 | 0 | 40 | 30 | 70 |
| Digitaria sanguinalis | 100 | 100 | 40 | 70 | 40 | 80 |
| Echinochalo crus-galli | 90 | 100 | 30 | 50 | 35 | 70 |
| Alopecurus myosuroides | 70 | 80 | 20 | 50 | 50 | 80 |
| Poa annua | 95 | 100 | 20 | 35 | 60 | 90 |
| Lolium perenne | 90–100 | 100 | 20 | 35 | 50 | 90 |
| Avena fatua | 0–10 | 20 | 70–80 | 90 | 80 | 100 |
| Thlaspi arvense | 50 | 70 | 70–80 | 100 | 90 | 100 |
| Amaranthus retroflexus | 0–10 | 20 | 90–100 | 100 | 90–100 | 100 |
| Sinapis arvensis | 10 | 15 | 80 | 90–100 | 100 | 100 |
| Raphanus raphanistrum | 20 | 40 | 80 | 90–100 | 100 | 100 |

| | Active ingredient | | | | | | |
|---|---|---|---|---|---|---|---|
| | I | | XIV | | XV | | I+XIV | I+XV |
| Application rate in kg./ha | 3 | 4 | 1 | 4 | 1 | 4 | 3+1 | 3+1 |
| Glycine hispida | 0 | 0 | 0 | 40 | 0 | 50 | 0 | 0 |
| Zea Mays | 0 | 0 | 0 | 40 | 0 | 20 | 0 | 0 |
| Setaria viridis | 90 | 100 | 20 | 60 | 30 | 70 | 100 | 100 |
| Digitaria sanguinalis | 100 | 100 | 30 | 70 | 40 | 80 | 100 | 100 |
| Echinochloa crus-galli | 90 | 100 | 40 | 95 | 50 | 100 | 130 | 100 |
| Alopecurus myosuroides | 70 | 80 | 20 | 80 | 30 | 90 | 90 | 100 |
| Poa annua | 95 | 100 | 10 | 70 | 20 | 95 | 100 | 100 |
| Lolium perenne | 90–100 | 100 | 10 | 70 | 20 | 90 | 100 | 100 |
| Thlaspi arvense | 50 | 70 | 80 | 100 | 90 | 100 | 100 | 100 |
| Amaranthus retroflexus | 0–10 | 20 | 80 | 90 | 100 | 100 | 90–100 | 100 |
| Sinapis arvensis | 10 | 15 | 90 | 100 | 100 | 100 | 100 | 100 |
| Raphanus raphanistrum | 20 | 40 | 90 | 100 | 100 | 100 | 100 | 100 |

0 = no damage; 100 = complete destruction.

These results show that the herbicides according to the invention have not only a surprising action on weeds but also in particular a selective action which could not be expected from a knowledge of the components of the mixture.

EXAMPLE 8

An agricultural site is sown with cotton (*Gossypium herbaceum*), Indian corn (*Zea mays*), yellow foxtail

| | Active ingredient | | | |
|---|---|---|---|---|
| | XVIII | | I+XVI | I+XVII | I+XVIII |
| Application rate in kg./ha | 1 | 4 | 3+1 | 3+1 | 3+1 |
| Gossypium herbaceum | 0 | 30 | 0 | 0 | 0 |
| Zea mays | 0 | 30 | 0 | 0 | 0 |
| Setaria glauca | 10–20 | 50 | 90 | 100 | 100 |
| Digitaria sanguinalis | 20 | 70 | 100 | 100 | 100 |
| Echinochloa crus-galli | 10 | 60 | 100 | 100 | 100 |
| Alopecurus myosuroides | 30 | 70 | 90 | 100 | 100 |

| | Active ingredient | | | |
|---|---|---|---|---|
| | XVIII | I+XVI | I+XVII | I+XVIII |
| Application rate in kg./ha | 1 | 4 | 3+1 | 3+1 | 3+1 |
| Poa annua | 70 | 100 | 100 | 100 | 100 |
| Lolium perenne | 60 | 100 | 100 | 90-100 | 100 |
| Avena fatua | 90-100 | 100 | 80 | 80-90 | 100 |
| Thlaspi arvense | 80 | 100 | 100 | 100 | 100 |
| Amaranthus retroflexus | 100 | 100 | 100 | 100 | 100 |
| Sinapis arvensis | 00 | 100 | 90 | 100 | 100 |
| Raphanus raphanistrum | 90 | 100 | 100 | 100 | 100 |

0 = no damage; 100 = complete destruction.

These results show that the herbicides according to the invention have not only a surprising action on weeds but also in particular a selective action which could not be expected from a knowledge of the components of the mixture.

The action of the following mixtures corresponds to that of those described in Examples 1 to 8:

the acid anilide derivatives
  chloroacetic acid-N-3-methylbutyn-(1)-yl-(3)-anilide, and
  chloroacetic acid-N-3-methylbutyn-(1)-yl-(3)-m-methylanilide
in admixture with the pyridazone compounds named in Examples 1 to 5 or with the oxazolidinedione compounds named in Examples 6 to 8.

We claim:

1. A herbicide composition consisting essentially of a herbicidally effective amount of
a. an anilide having the formula

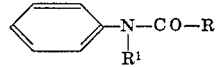

wherein R denotes $CH_2Cl$ and $R^1$ denotes isopropyl or butynyl and (b) 2-(3,4-dichlorophenyl)-4-methyl-1,2,4-oxadiazolidine-3,5-dione, the weight ratio of a to b being in the range of 1:1 to 1:3.

2. A herbicide composition consisting essentially of a herbicidally effective amount of a mixture of chloroacetic acid-N-butyn-(1)-yl-(3)-anilide, and (b) 2-(3,4-dichlorophenyl)-4-methyl-1,2,4-oxadiazolidine-3,5-dione in a ratio of 1:1 to 1:3.

3. A process for controlling growth of unwanted plants which comprises applying to the plants or to the soil in which the growth of the plants is to be prevented a herbicidally effective amount of a herbicide composition consisting essentially of a mixture of (a) chloroacetic acid-N-butyn-(1)-yl-(3)-anilide, and (b) 2-(3,4-dichlorophenyl)-4-methyl-1,2,4-oxadiazolidine-3,5-dione in a weight ratio of 1:1 to 1:3.

* * * * *